(12) United States Patent
Menachem et al.

(10) Patent No.: US 7,971,136 B2
(45) Date of Patent: Jun. 28, 2011

(54) SYSTEM AND METHOD FOR DYNAMIC MESSAGE PLACEMENT

(75) Inventors: Uri Ben Menachem, St. Netanya (IL); Adam Gur, St. Kfar Saba (IL)

(73) Assignee: Endless Spaces Ltd., Kfar Saba (IL)

( * ) Notice: Subject to any disclaimer, the term of this patent is extended or adjusted under 35 U.S.C. 154(b) by 921 days.

(21) Appl. No.: 11/749,402

(22) Filed: May 16, 2007

(65) Prior Publication Data

US 2008/0244391 A1 Oct. 2, 2008

Related U.S. Application Data

(60) Provisional application No. 60/907,108, filed on Mar. 21, 2007.

(51) Int. Cl.
*G06F 21/00* (2006.01)
(52) U.S. Cl. ......... 715/232; 715/230; 715/231; 715/233
(58) Field of Classification Search .................. 715/200, 715/201, 203, 230, 231, 232, 234, 243, 246, 715/253
See application file for complete search history.

(56) References Cited

U.S. PATENT DOCUMENTS

| | | | |
|---|---|---|---|
| 5,825,775 A * | 10/1998 | Chin et al. ..................... | 370/401 |
| 6,311,185 B1 | 10/2001 | Markowitz et al. ............. | 707/10 |
| 6,630,943 B1 | 10/2003 | Nason et al. ................... | 715/746 |
| 6,725,203 B1 | 4/2004 | Seet | |
| 6,847,992 B1 | 1/2005 | Haitsuka | |
| 6,934,743 B2 * | 8/2005 | Huat ............................. | 709/218 |
| 7,039,872 B1 | 5/2006 | Raheman ...................... | 715/748 |
| 7,051,351 B2 | 5/2006 | Goldman et al. ............... | 725/34 |
| 7,251,782 B1 * | 7/2007 | Albers et al. ................... | 715/711 |
| 7,464,121 B2 * | 12/2008 | Barcia et al. ........................... | 1/1 |
| 7,533,331 B2 * | 5/2009 | Brown et al. ................. | 714/807 |
| 7,660,711 B2 * | 2/2010 | Pita et al. ........................ | 703/10 |
| 2001/0040499 A1 * | 11/2001 | Amma .......................... | 340/7.55 |
| 2002/0133565 A1 * | 9/2002 | Huat ............................. | 709/218 |

(Continued)

FOREIGN PATENT DOCUMENTS

WO 0073920 A2 12/2000

(Continued)

OTHER PUBLICATIONS

International Search Report mailed Aug. 21, 2008 for PCT/IL2008/00133 filed Jan. 31, 2008 (claims priority to U.S. Appl. No. 11/749,402).

(Continued)

*Primary Examiner* — Stephen S Hong
*Assistant Examiner* — Gregory J Vaughn
(74) *Attorney, Agent, or Firm* — Martin Fleit; Paul D. Bianco; Fleit Gibbons Gutman Bongini & Bianco PL

(57) ABSTRACT

The present invention is a system and a method for selecting an appropriate location for displaying messages, such as graphic or textual advertisements, on the display screen of users of electronic devices. Embodiments of the present invention employ algorithms for analyzing the graphic content of the screen in real-time to select the most appropriate position for placing the message. In addition, according to some embodiments of the present invention the activities of the user are also monitored to enhance the suitability of the selected position of the advertisements. The algorithm constantly monitors screen information and user activity and removes the message whenever the selected area is no longer appropriate for displaying the message.

35 Claims, 2 Drawing Sheets

U.S. PATENT DOCUMENTS

| | | | |
|---|---|---|---|
| 2002/0188527 A1 | 12/2002 | Dillard | |
| 2003/0028884 A1* | 2/2003 | Swart et al. | 725/51 |
| 2003/0104840 A1 | 6/2003 | O'Hare et al. | 455/566 |
| 2003/0128234 A1 | 7/2003 | Brown et al. | 715/744 |
| 2004/0015608 A1 | 1/2004 | Ellis et al. | 709/246 |
| 2004/0031058 A1 | 2/2004 | Reisman | |
| 2004/0239703 A1 | 12/2004 | Angelica | 345/962 |
| 2006/0026628 A1 | 2/2006 | Wan et al. | 725/32 |
| 2006/0031415 A1 | 2/2006 | Serena | 709/219 |
| 2006/0031419 A1* | 2/2006 | Huat | 709/219 |
| 2006/0123313 A1* | 6/2006 | Brown et al. | 714/758 |
| 2006/0287913 A1* | 12/2006 | Baluja | 705/14 |
| 2007/0033269 A1 | 2/2007 | Atkinson et al. | 709/219 |
| 2007/0050812 A1 | 3/2007 | Ebata | |
| 2007/0162457 A1* | 7/2007 | Barcia et al. | 707/10 |
| 2008/0244391 A1 | 10/2008 | Menachem et al. | |

FOREIGN PATENT DOCUMENTS

| | | |
|---|---|---|
| WO | WO/0073920 | 12/2000 |
| WO | 2008139438 A2 | 11/2008 |

OTHER PUBLICATIONS

Written Opinion of the International Searching Authority published Jan. 8, 2010 for PCT/IL2008/000133 filed Jan. 31, 2008.

International Preliminary Report on Patentability published Jan. 12, 2010 for PCT/IL2008/000133 filed Jan. 31, 2008.

\* cited by examiner

SYSTEM AND METHOD FOR DYNAMIC MESSAGE PLACEMENT

CROSS-REFERENCE TO RELATED APPLICATIONS

This application claims the benefit under 35 U.S.C. §119 (e) of U.S. Provisional Patent Application No. 60/907,108 filed Mar. 21, 2007, the content of which is incorporated by reference herein.

FIELD OF INVENTION

The present invention relates to the field of selecting messages placement on electronic displays in real-time; more particularly the present invention relates to systems and methods for calculating the optimal placement of messages on an electronic display in accordance with the content of the display and user activity.

BACKGROUND OF THE PRIOR ART

While advertising has become one of the predominant financial commercial engines behind many internet endeavors, professionals are finding that identifying new location suitable for placing messages and the decision where to place the commercial message is becoming increasingly significant. Currently there are several known schemes for placing commercial messages to the users. According to the first, the commercial message is embedded into the web pages and the users are exposed to the commercial messages when they enter the web page. The content of the message can be dynamically selected when the page is requested and tailored to specific needs.

According to a second scheme the commercial message is presented to users in a pop-up window. The window appears on top of all other windows while the user is working. In such cases users are required to close the pop-up window or reselect the previous window in order to continue working.

A third scheme includes a method for identifying spaces appropriate for displaying commercial messages inside an internet browser window. Upon identifying such a location the web page is modified and the advertisement appears in the previously empty area. This technology is not commonly used since it offers little advantages over placing the advertisement in predestined location as described above.

According to an additional scheme advertisements are placed in the windows of specific application programs specially coded to allow this option. In such cases the advertisements are usually placed in locations which do not interfere with the interface of the application. This option can be implemented as part of this specific application program or as an external application which communicates with this specific program. However, the location of the advertisement is limited to the windows of this specific application program.

United States Patent Application No. 20040015608 discloses a method and system for dynamically incorporating advertising content into multimedia environments. The system provides a minimally intrusive mechanism that allows a content provider such as an advertiser to dynamically incorporate content, such as advertisements, into a video game or other target communication device or multimedia presentation. The advertising is always inside the specifically handled application or browser window.

United States Patent Application No. 20030128234 discloses a system and method which enable utilizing document white space to persistently display designated content. The invention enables a web browser or viewer program to identify the white space, such as the background space of a document, and to utilize the identified white space for displaying content that has been designated as content that is to be persistently displayed regardless of user actions. The advertising is always inside the specifically handled application or browser window. Only a single program or browser window, usually based upon "Document Object Model interface", is handled. The program will even rearrange its displayed information in order to leave more empty space for advertisements.

U.S. Pat. No. 7,039,872 discloses method and system of creating floating windows for displaying sponsor information, messages or programs in non-obtrusive areas of the graphic user interface of a software application. This patent displays advertisements over a fixed area of the application. Such areas can be the menus or window borders. United States Patent Application No. 20070033269 discloses a computer method and apparatus using embedded message window for displaying messages in a functional bar. Message windows are embedded in a functional bar, such as the toolbar, status bar, address bar and task bar. The messages displayed in the windows are based on searches conducted by the user. The software program in which the windows are embedded may be a browser or non-browser application.

United States Patent Application No. 20060026628 discloses a method and apparatus for inserting additional content into video. The method and apparatus inserts virtual advertisements or other virtual contents into a sequence of frames of a video presentation by performing real-time content-based video frame processing to identify suitable (non-intrusive) locations in the video for implantation. The advertising is always inside the specifically handled application or browser window.

United States Patent Application No. 20060031415 discloses a method for controlling content in an application program. The method includes determining whether monitored content corresponds to a predetermined advertisement and replacing it with another predetermined advertisement based on the user input. The advertising is always inside the specifically handled application or browser window.

U.S. Pat. No. 7,051,351 discloses systems and methods of inserting advertisements into an information retrieval system display. These are systems and methods for selecting and inserting advertisements in an information document displayed to a user, wherein the selection is based at least in part on television programming viewed by the user.

U.S. Pat. No. 6,311,185 discloses a method and apparatus for modifying an information page transmitted in a communications network. Information page data, such as hypertext markup language data, is obtained for the requested information page. Additional data, such as an advertisement, is selected and the information page data is modified to include the additional data based on attributes of the requested information page. The modified information page data is then sent to the client computer for display.

U.S. Pat. No. 6,630,943 is a method and system for controlling a complementary user interface on a display surface. This patent combines a hardware and software solution that generates an alternate display. This new display is used for advertisement placement.

U.S. Pat. No. 6,934,743 discloses a method and system for displaying advertisements over the unused area of a Web browser. A process is linked to the web browser program and monitors the web page contents and user activity. When it identifies areas that are not used inside the web browser display area, an advertisement is displayed there. This patent is limited to areas inside a web browser, makes use of the fact that its easy to know that changes occur in a web page and offer little advantage over embedding the ads in pre-designated locations.

US Patent Application No. 2004239703 discloses a method and system for creating additional advertising space by sensing the position of an element on a web page or other client viewer. When a user interacts with that element, the system positions the appearance of additional web page elements not limited by the boundary of the initial element.

US Patent Application No. 2003104840 discloses a system and a method for displaying an advertisement so as to limit intrusiveness for a user by not interfering with the utilization of the communications device by the user. The system and method initiate a display of the advertisement message on the display when normal utilization of the electronic device will not be compromised. This method is primarily concerned with the timing of when to display the message.

International Patent Application No. WO/0073920 discloses a system and a method which use the substrate areas of a software application for displaying sponsor messages/information, contained in one or more floating windows. The information hiding behind the floating windows can be accessed in a non-intrusive manner in one of the several automatic cursor-responsive ways described in the embodiment. Additionally, such cursor-responsive floating windows are not restricted to the substrate areas and can be located in the document area for displaying information in layers. This patent application only searches a given application window for a suitable location for placing the message.

There is therefore a need for a solution which would enable placing commercial messages in a manner which would not interfere with the workflow of the user, taking into account the full display screen of the user. Such a solution would need to analyze the content of the entire user display and the activity of the user in real-time and would select the location of such messages accordingly. Thus, previously unused space can be detected and utilized. This solution would also later remove the message if and when it is about to interfere with said workflow.

SUMMARY OF INVENTION

Disclosed is a method for placing a message on a display of an electronic device according to predefined criteria. The method comprises the steps of analyzing the information on the display and identifying in the display an area which adheres to predefined criteria. The criteria ensure maximal exposure of the message while minimizing the interference created to the workflow of the user of the electronic device. The method also includes the steps of placing the message in the identified area and removing the message whenever particular changes are identified in the display. The particular identified changes are optionally in the area underlying the message or in proximity to the area of the message.

The method optionally also includes the step of monitoring the area underlying the message or the area adjacent to the message area. The removal of the message is optionally performed whenever any changes are identified in the monitored area or whenever the monitored area deviates from the predefined criteria. The predefined criteria are optionally identified according to the frequency of changes in the area, visual pattern analysis of the area, or monitored user activity in the area. The visual pattern analysis optionally includes identifying at least one of the following patterns: a monotonous color, textures and colors which are very faint, background texture, a constant gradient of colors, a small pattern.

The size of the message is optionally adjusted according to the size of the identified area. The content of the message is optionally determined in accordance with the dimensions of the identified area. The criteria according to which the area is identified are optionally determined in accordance with the time period it takes to find the area wherein the criteria are relaxed the longer the time period is. The criteria according to which the area is identified are optionally selected in accordance with the status of the windows in the display.

Optionally, message is displayed using a top-level window. The message can optionally include text, graphic images, animated images, video content, hyperlinks, multimedia, or any combination thereof.

The method can optionally also include the step of taking a snapshot of the area before placing the message, thus, the monitoring is performed in comparison to the snapshot. The monitoring is optionally performed by accessing graphic data of windows underlying the area. The monitoring is optionally performed by calling operating system functions, or by hooking into operating system functions.

The method optionally also includes the step of causing at least part of the message to flicker at high rates, thus the monitoring is performed by analyzing the underlying area as the message flickers.

The method optionally also includes the step of displaying the message with semitransparent attributes. The monitoring is optionally performed by extracting the information concerning the underlying area from the semitransparent display. The information from the underlying area is optionally extracted by removing the message data from the combined data received for the area. The monitoring of the underlying area is optionally performed by using operating system calls that ignore the semitransparent message data and return only the graphic data of the underlying area.

The method optionally also includes the step of displaying only particular colors in the message in a transparent display. Thus, the monitoring is performed by extracting the information concerning the underlying area from the transparent segments. Optionally, colors are selected in accordance with a color analysis of the message. The message optionally flickers between an opaque display and a semitransparent display. Thus, the monitoring is performed by extracting the information concerning the underlying area from the semitransparent display. The message is optionally displayed gradually, first appearing in high levels of semi-transparency, wherein the longer the message is displayed the levels of its semi-transparency decrease.

The content of the message is optionally determined in accordance with a user profile of the user and with the monitored behavior of the user. The preferences of the system are optionally determined by the user.

The message is optionally removed after a predetermined time period. Optionally, the message is displayed without making use of an operating system window. Thus, the message is removed whenever segments of the message are overwritten.

Also disclosed is a system for placing a message on a display of an electronic device according to predefined criteria. The system comprises a screen analysis module for analyzing the display of the electronic device and identifying in the display an area which ensure maximal exposure of the message while not interfering with the workflow of the user of the electronic device. The system also comprises a message placement module for placing the message in the display, and a monitoring and message removal module for analyzing the area underlying the message, determining the time of message removal and removing the message.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figure 1:
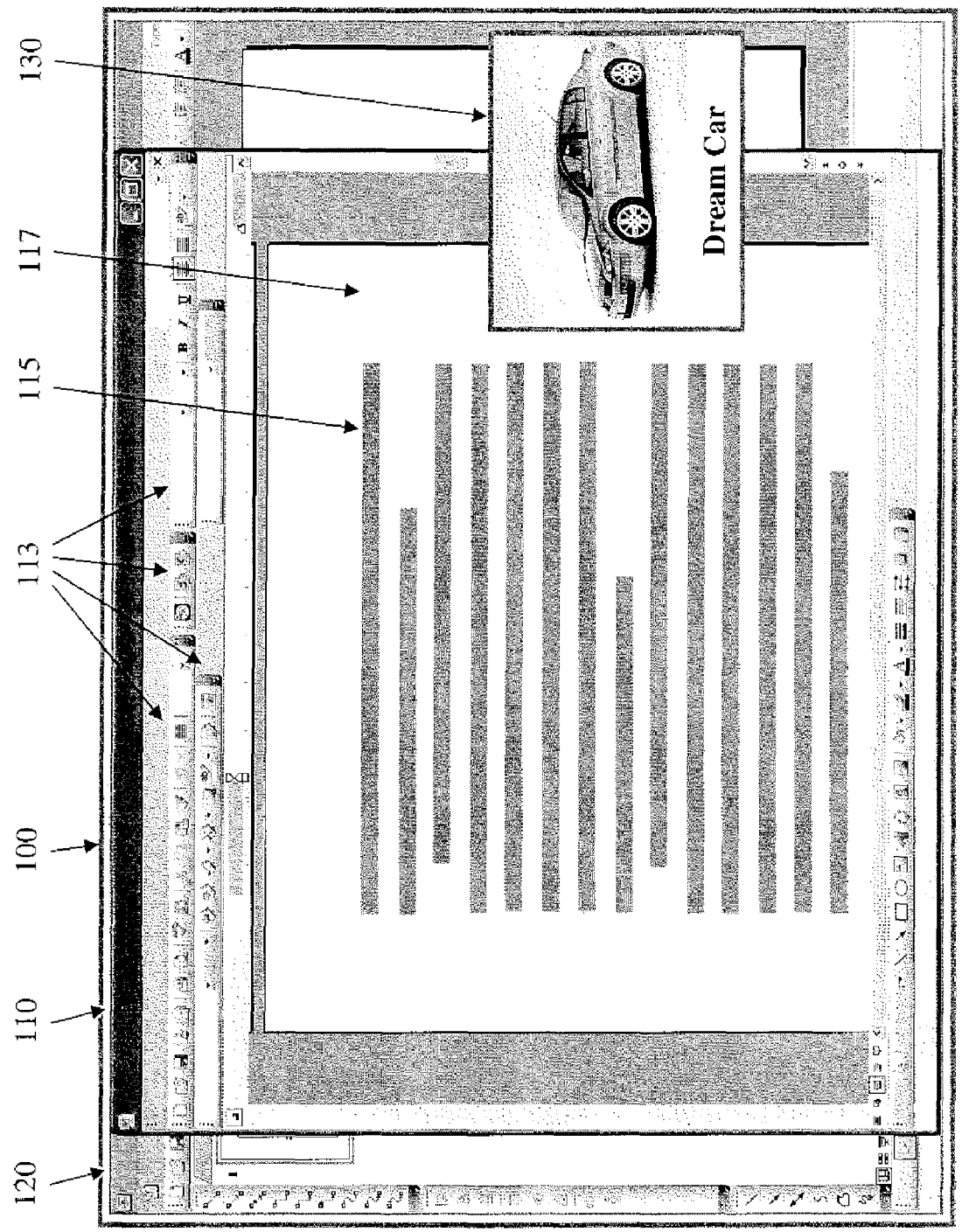
FIG. 1 is an illustration of a screenshot in accordance with an embodiment of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate reference numerals may be repeated among the figures to indicate corresponding or analogous elements.

DESCRIPTION OF SOME EMBODIMENTS OF THE INVENTION

The present invention is a system and a method for selecting appropriate locations for displaying messages, such as graphic or textual advertisements, on the display screen of users of electronic devices. Such electronic devices can include, but are not limited to, desktop or laptop computers, interactive television systems personal assistant devices (PDA), cellular devices or any other device which can establish a connection with an electronic data network, such as the internet, and includes an electronic graphic interface screen. Embodiments of the present invention employ algorithms for analyzing the graphic content of the screen in real-time to select the most appropriate position for placing the message. In addition, according to some embodiments of the present invention the activities of the user are also monitored to enhance the suitability of the selected position of the advertisements. The algorithm constantly monitors screen information and user activity and removes or relocates the message whenever changes in the selected area used for displaying the message occur or are about to occur and the selected area is no longer appropriate for displaying the message. The displayed message can optionally be a commercial message, such as an advertisement, or any other type of message, such as news clips or stock information.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to he understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

The terns "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

As aforementioned, the present invention enables an automatic placement of messages, such as advertising messages, on the display screen of the electronic device or computer of the user. The position of the advertisement on the screen is selected in accordance with predefined criteria. The description below refers to selecting the position of the messages in a location which is visible to the user while minimally interfering with the user workflow. However, this description is given as an example only, and should not be regarded as limiting the scope of the described invention. Other embodiments of the present invention can optionally determine other criteria according to which the most appropriate location of the message may be determined. According to some embodiments of the present invention the message is received from an external server residing on an electronic communication network such as the internet.

According to some embodiments the described system and method is implemented by a dedicated application program which runs on the client device of the user. According to additional embodiments of the present invention the described system and method can be implemented as features added to a different application program such as an antivirus or a free dictionary.

FIG. 1 is an illustration of a screen shot in accordance with an embodiment of the present invention. In the illustrated example, full display screen 100 includes active window 110 and a background window 120. The full display screen 100 is scanned by a dedicated algorithm which is described below. The algorithm identifies regions of the screen which do not contain crucial information for the workflow of the user and places message 130 in that area. In the illustrated example active window 110 is of a word processing application. The location selected for message 130 should not coincide with the text 115 or with the menus 113 of the word processing window 110. The location selected for displaying message 130 includes margins 117 of the document displayed in window 110 and the background window 120.

Figure 2:
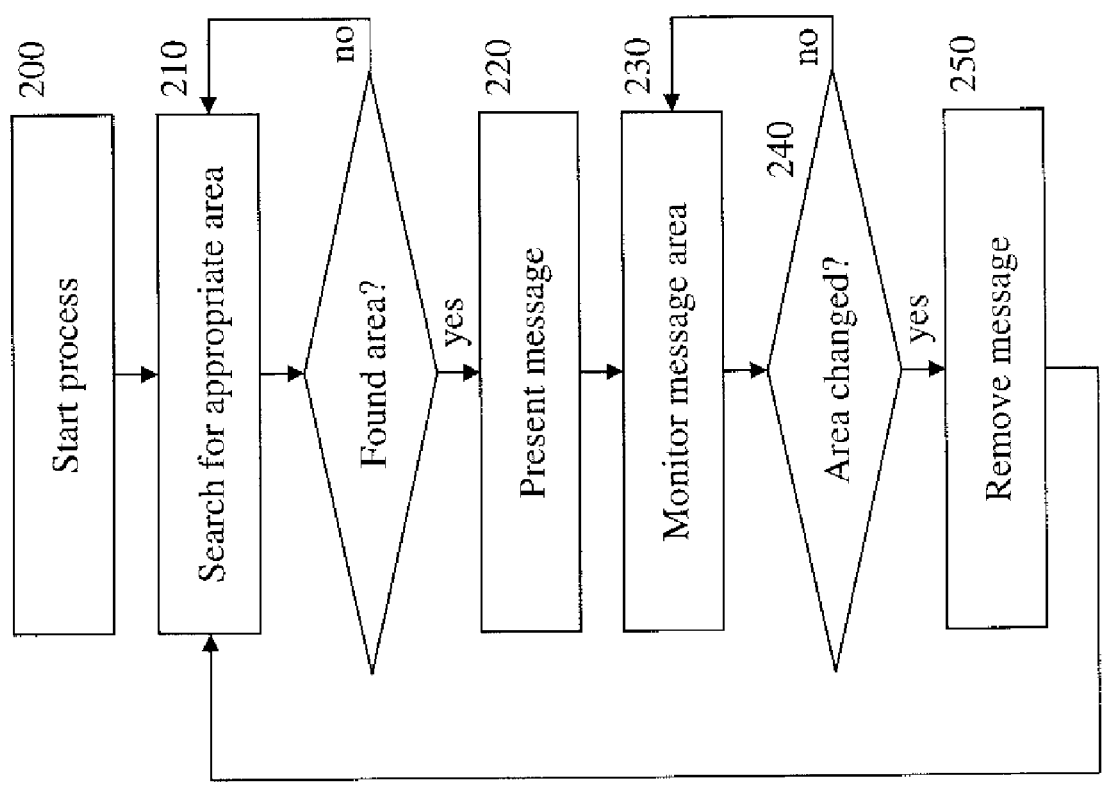
FIG. 2 is a flowchart illustrating the process of selecting an appropriate area for displaying a message in accordance with some embodiments of the present invention.

FIG. 2 is a flowchart illustrating the process of selecting an appropriate area for displaying a message in accordance with some embodiments of the present invention. Once the process starts operating (step 200) the algorithm is activated and it scans the entire graphic display and searches for an appropriate area for displaying the message (step 210). The algorithm continues searching until a suitable area is found. Once a suitable area is located, the process presents the message (step 220). While the message is displayed the process continuously monitors the data of the area underlying the message (step 230) and identifies any changes made or about to be made in this area (240). According to one embodiment of the present invention, if any changes or expected changes are detected in the area underlying the message (step 240) the message is removed (step 250). According to other embodiments of the present invention once changes are detected in the area underlying the message these changes are examined. If due to the changes in the area the area is no longer suited for presenting the message the message is removed (step 250). Additionally, if the user requests to remove the message the message is removed (step 250). After removing the message the process activates the algorithm for searching for an appropriate area once again (step 210). These steps repeat until the process is terminated.

According to some embodiments of the present invention, the described system and method can optionally be used for placing more than one message simultaneously. In these embodiments, while some messages are displayed additional spaces are searched for.

According to one embodiment of the present invention the message data can be stored locally on the client device of the user. According to other embodiments of the present invention part or all of the information can be retrieved in real-time from the electronic network to which the client device is connected.

According to some embodiments of the present invention the process illustrated in FIG. 2 can be active at all times. According to additional embodiments of the present invention the activation of the process can be determined in relation to other parameters such as the level of activity of the user, available resources on the user device and the like.

As mentioned above, in some embodiments of the present invention the criteria according to which the appropriate area is selected is that the area in question should cause as little interference as possible to the workflow of the user, and that this area should not hold any information which is of interest to the user. The following are a few methods according to which the area for displaying the message is selected in accordance with those embodiments. The embodiment can optionally include any of the following methods or any combination thereof. According to the first method, the algorithm searches for an area which includes a monotonous or an almost monotonous color composition. The level of monotonousness can optionally be determined according to the monitor and display types. According to the second method, the selected area includes textures and colors which are very faint.

Similarly, the selected area can optionally be identified as a background texture. For instance, the selected area can optionally be identified as including no application windows in it and including only the background image or texture of the operating system. Additionally, the selected area can optionally include a constant gradient of colors or be composed of a small pattern. An additional method includes selecting an area in accordance with any of the above described options which also includes vertical or horizontal lines.

According to yet another method, the selected area can optionally be identified by the algorithm as an area in which there were no changes for a predetermined time period. According to yet another method, the selected area can optionally be identified by the algorithm as an area that is of little interest for the user such as advertisements. The selected area can optionally be composed of several sections which each satisfies at least one of the above described methods.

The optimal size for the message is optionally predefined. Provided that the algorithm does not find a suitable area for the optimal size of the message over a predetermined time period, the algorithm can optionally be programmed to search for a smaller area and position a scaled version of the message in that area. If more than one message is available, one of the criterion for selecting which message to use can optionally be the size of the message in comparison to the found area.

The algorithm can optionally be preprogrammed to use different criteria for different application types. Specific rules can be customized to suit particular applications. For instance, the algorithm can optionally be programmed not to place any messages in the area of some application programs. Alternatively, the algorithm can be programmed to place messages inside some application programs even if the area is not free.

According to an additional method, the algorithm also detects the user activity in order to select a suitable area. The algorithm monitors the areas in which the pointer of the mouse is located and where the curser of the active application window is and rules out segments of the screen which are found to include regular user activity.

If after a predefined time period no suitable area is identified by the algorithm, the algorithm can optionally be programmed to use a relaxed set of parameters for identifying an area for the message. For instance provided that the algorithm searches for an area with a color span of ±2 bits, if after three minutes no such area is found the color span can be increased to ±4 bits.

Additionally, different criteria can optionally be used for searching for an area within the active window than the methods used for searching for an area in inactive windows. For instance, stricter methods can optionally be used for the active window than the methods used for inactive windows since most likely the workflow of the user depends mostly on the active window.

As illustrated in FIG. 2, after a suitable area for displaying the message is selected, the process displays the message in the selected area (step 220). If necessary, the message is horizontally and vertically scaled to fit the selected area. Additionally, the message can optionally be selected according to the size and proportion of the selected area. The message may be displayed in the selected area using methods which are known to people who are skilled in the art. According to one embodiment of the present invention the message is displayed in a top-level operating system borderless window at the selected area. According to this embodiment, the window which includes the message remains always on top without becoming the active window, so as not to interfere with the workflow of the user.

The message window can include any type of graphic content supported by the display type and the operating system. The message can optionally contain only a text message, a graphic image, animated images, multimedia, video content or any combination thereof. Additionally, the message window can optionally be an internet browser window equipped with all the browsing capabilities such as hyperlinks and multiple pages.

The following description relates to the steps of monitoring the area in which the message is displayed (step 230) and deciding when to remove it (step 240). According to one embodiment the monitoring algorithm can optionally decide to remove the message window whenever any changes are detected in the area underlying the message. In order to detect any changes in the area underlying the message the algorithm takes a snapshot of the area before displaying the message. Thus all comparisons are performed in relation to the snapshot. According to an additional embodiment, the monitoring algorithm can optionally decide to remove the message window when the area underlying the message no longer corresponds to the criteria used for selecting this area or other criteria related to the user workflow.

Since the screen area where the message is displayed contains the message data, there is a need to find methods for monitoring the area underlying the message in order to detect any changes or expected changes in it. This task demands particular solutions since the algorithm needs to monitor the display data of an area which is below the message window and therefore is not displayed. Below are a few methods for monitoring changes in the area underlying the message. According to embodiments of the present invention the monitoring algorithm can optionally make use of any of the described methods or any combination thereof.

According to the first method, the method can access screen data concerning the screen and windows of other active applications using operating system calls. Similarly, the method can continuously scan open windows of relevant running applications and extract the information concerning the selected area. The message is removed based on the collected data. According to another embodiment of the present invention information concerning available areas for displaying the message are received from the operating system having a built in support for this task.

According to a second method, the algorithm can monitor all pertinent system calls of the operating system. The algorithm extracts the relevant information concerning the selected area from the system calls and detects changes performed in this area. One such method of monitoring the relevant system calls is known to people who are skilled in the art as hooking. According to an additional method the message window or parts of it can flicker in high rates which are not detectable by the human eye. During these flickers the method can access information about the area in which the message is displayed and detect any changes in it.

According to yet another method the monitoring algorithm can optionally monitor the area around the boundaries of the displayed message. This area is not covered by the message and can be monitored using techniques known to people who are skilled in the art. This method relies on the fact that most likely, any changes in the area underlying the message would also affect the display in the areas adjacent to it.

According to another method the message can optionally be displayed in a semitransparent manner. A low level of transparency would still display the message clearly to the user and enable the monitoring algorithm to detect any changes in the area underneath the displayed message. For instance, the transparency rate can optionally be set to around 90% allowing 10% of the information of the area underlying the message to be available for the algorithm for analysis. Depending on the operating system, there are two methods for analyzing the semitransparent data of the display underlying the message window. According to the first, the algorithm receives only data concerning the underlying display; in this case the algorithm simply analyzes this data to detect any changes in this area. According to the second method, the algorithm receives the combined information including the message data and the data concerning the underlying display. In such cases the algorithm detracts the message data from the combined information to extract only the data concerning to the underlying display.

According to another method, particular colors in the message can be designated to be transparent. The algorithm selects which colors are to be transparent according to a color analysis of the original message. The frequency of the selected colors in the original message should not be too high, as not to affect the display of the message too much, and not too low, so that sufficient information about the underlying display may be retrieved. The peripheral area of the message and some none-essential internal message segments can also be set to the transparent colors to increase the monitored area. According to yet another method, parts of the message area are set as transparent for a short duration and than changed back to the original condition. In that short duration the underlying area is read. Since this duration is short the user perception of the message is not affected.

According to another method the message can be displayed to the user without using an operating system window by writing directly to the screen. In such cases whenever there are any changes in the screen display in the area of the message the message display would be partially or completely overwritten. Whenever such a change is detected by the algorithm, the algorithm would remove the entire message and restore the display data of the underlying layers.

According to some embodiments of the present invention the message can optionally be displayed gradually, first almost completely transparent, and slowly decreasing the level of transparency. The level of transparency is decreased provided that no changes are detected in the selected area and that the user does not request to remove the message.

According to some embodiments of the present invention the system can display the commercial message in accordance with user profile, user feedback and user activity. As known to people who are skilled in the art, the content of commercial messages can be determined according to data gathered about the user. This is preferably done with user consent. This data can be gathered by monitoring screen text, keyboard activities and the like. Such data can optionally include information about the users such as geographic location, personal and professional status and the like for market slicing. Additionally such systems can gather information about the fields of interest and internet usage habits of the user for a more precise targeting of particular commercial campaigns.

The user can remove or interact with the message window using any type of indicator known in the art. For instance, the user can optionally click on a "close window" option or a "X" option to remove the window. Clicking on the message itself indicates that the user wishes to receive additional information concerning the message and would automatically present this information to the user. For instance, the system can initiate opening a new internet browser window with the website of the company promoting the product. Additionally, the message window can be removed by the user by using a predefined gesture of the mouse, such as making a circular mark on top of the message.

According to some embodiments of the present invention the user can determine the preferences of the system. For instance, the user can set the level of sensitivity of the system. The level of sensitivity of the system influences the severity according to which different criteria determining the selected area are taken into account. For instance, operating in a higher level of sensitivity the system demands that stricter conditions are met before a selected area is determined as suitable for displaying the message. Additionally, the user of the system can optionally send feedback to the system. According to user feedback the system can adjust the criteria for selecting an area for displaying the message for the particular user. User feedback can optionally be statistically analyzed. The system behavior can optionally be altered provided that recurring patterns are detected in the feedbacks of a large percentage of the users.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A computer implemented method for placing a message on a display of an electronic device, wherein said display includes at least one area of at least one application, which a user uses, said method comprising:
    monitoring and analyzing the information on said display, in real-time;
    identifying in said display an area which adheres to predefined criteria, wherein said criteria ensures maximal exposure of said message while not interfering the workflow of the user of said electronic device;
    placing said message in said identified area;
    identifying at least one change in partial area of the display where the message is placed, said identification based on analyzing display information wherein said change occurs at only in partial area of the screen in proximity to the message not affecting the full screen display, wherein the change is not initialized by scrolling operations or uploading operations;
    removing the message from the area;
    identifying a new area in the display that allows placing another message not interfering with the workflow; and
    placing the other message in the another identified area of interference, upon identification the change,
    wherein said method enables said identification of areas and said placing and removing of messages in and from the at least one area for areas of different types of applications, including web and non-web applications, used by the user;
    wherein the information analyzing, the identifying of an area, the identifying of at least one change is achieved by using operating system calls for accessing graphic content of the screen.

2. The method of claim 1 wherein said identified changes are: changes in the area underlying said message and changes in proximity to the area of the message, further comprising the step of displaying said message with semitransparent attributes, wherein said monitoring is performed by extracting the information concerning said underlying partial area from said semitransparent display using operating system calls that ignore the semitransparent message data and return only the graphic data of the underlying area, wherein the transparency rate is set between 85% and 99% allowing 1%-15% of the information of the area underlying the message to be available for the extracting information beneath.

3. The method of claim 2, further including the step of monitoring the area underlying said message wherein said removal of said message is performed whenever at least one change is identified in said underlying area.

4. The method of claim 2, further including the step of monitoring the area underlying said message wherein said removing of said message is performed whenever said underlying area deviates from said predefined criteria.

5. The method of claim 4 wherein said visual pattern analysis includes identifying at least one of the following patterns: a monotonous color, textures and colors which are very faint, background texture, a constant gradient of colors, a small pattern.

6. The method of claim 2, further including the step of taking a snapshot of said area before placing said message, wherein said monitoring is performed by comparing said current display area to a previously taken snapshot.

7. The method of claim 2 wherein said monitoring is performed by accessing graphic data of windows underlying said area.

8. The method of claim 2 wherein said monitoring is performed through at least one of the following: calling operating system functions, hooking into operating system functions.

9. The method of claim 2, further including causing at least part of said message to flicker at high rates.

10. The method of claim 9 wherein said monitoring is performed by analyzing said underlying area as said message flickers.

11. The method of claim 2 wherein said monitoring is performed in the area adjacent to said message area.

12. The method of claim 2 further including the step of displaying said message with semitransparent attributes, wherein said monitoring is performed by extracting the information concerning said underlying area from said semitransparent display.

13. The method of claim 12 wherein said information from said underlying area is extracted by removing the message data from the combined data received for said area.

14. The method of claim 12 wherein monitoring underlying area is performed by using operating system calls that ignore the semitransparent message data and return only the graphic data of the underlying area.

15. The method of claim 2 further including the step of displaying only particular colors in said message in a transparent display, wherein said monitoring is performed by extracting the information concerning said underlying area from said transparent segments.

16. The method of claim 15 wherein said colors are selected in accordance with a color analysis of said message.

17. The method of claim 2 wherein said message flickers between an opaque display and a semitransparent display, wherein said monitoring is performed by extracting the information concerning said underlying area from said semitransparent display.

18. The method of claim 1, wherein the predefined criteria includes: the frequency of changes in said area, visual pattern analysis of said area and monitoring user activity in said area, wherein the monitoring is enabled by checking the areas in which the pointer of the mouse is located.

19. The method of claim 1 wherein the size of the message is adjusted according to the size of the identified area.

20. The method of claim 19, wherein the content of the message is determined in accordance with the dimensions of the identified area.

21. The method of claim 1 wherein the criteria according to which said area is identified are determined in accordance with the time period it takes to identify said area.

22. The method of claim 21 wherein said criteria for identifying an area of low interference are relaxed the longer said time period it takes for identifying said area.

23. The method of claim 1 wherein the criteria according to which said area is identified are selected in accordance with the status of the windows in said display.

24. The method of claim 1 wherein said message is displayed using a top-level window.

25. The method of claim 1 wherein said message includes at least one of the following: text, graphic images, animated images, video content, hyperlinks, multimedia.

26. The method of claim 1 wherein said message is displayed gradually, first appearing in high levels of semi-transparency, wherein the longer the message is displayed the levels of its semi-transparency decrease.

27. The method of claim 1 wherein the content of said message is determined in accordance with a user profile of the user and with the monitored behavior of the user.

28. The method of claim 1, further including removing said message after a predetermined time period.

29. The method of claim 1 wherein said message is displayed without making use of an operating system window.

30. The method of claim 29 wherein said message is removed whenever segments of said message are overwritten.

31. The method of claim 1, further comprising removing the message from the display, once no area of minimal interference identified.

32. The system of claim 1 wherein said identified changes are changes in the area underlying of said message, changes of partial area of the screen in proximity to the area of the message, further comprising the step of displaying said message with semitransparent attributes, wherein said monitoring is performed by extracting the information concerning said underlying area from said semitransparent display using operating system calls that ignore the semitransparent message data and return only the graphic data of the underlying area, wherein the transparency rate is set between 85% and 99% allowing 1%-15% of the information of the area underlying the message to be available for the extracting information beneath.

33. A system of computer software modules embodied on computer readable media for placing a message on a display of an electronic device according to predefined criteria, wherein the display includes at least one workflow, said system comprises
   a screen analysis module for analyzing said display in real-time and identifying in said display, an area which adheres to predefined criteria, wherein said criteria ensures maximal exposure of said message while minimizing the interference created to the workflow of the user of said electronic device;
   a message placement module for placing messages in identified areas;
   a monitoring and message removal module for identifying changes of partial area of the screen in proximity to the message location,
   wherein said change occurs at only in partial area of the screen in proximity to the message not affecting the full screen display, wherein the change is not initialized by scrolling operations or uploading operations;
   wherein upon identifying at least one change, the system enables identifying new area in the display that allows placing the message in a location minimizing the interference created to the workflow of the user, removing the message from the former identified area, and placing another message in the newly identified area, upon identification of a change in the area of the display where the former message was located, and wherein said system enables said identification of areas and said placing and removing of messages in and from the at least one area for areas of different types of applications, including web and non-web applications, used by the user
   wherein the information analyzing, the identifying of an area, the identifying of at least one change is achieved by intercepting operating system calls for accessing graphic content of the screen.

34. The system of claim 33, wherein the message placement module further enables removing the message from the display, once no area of minimal interference is identified.

35. A computer implemented method for placing a message on a display of an electronic device, wherein said display includes at least one area of at least one application, which a user uses, said method comprising:

monitoring and analyzing the information on said display, in real-time;

identifying in said display an area which adheres to predefined criteria, wherein said criteria ensures maximal exposure of said message while minimizing the interference created to the workflow of the user of said electronic device;

placing said message in said identified area;

displaying said message with semitransparent attributes, wherein said monitoring is performed by extracting the information concerning said underlying area from said semitransparent display identifying at least one change in the area where the message is placed;

wherein said identified changes are changes in the area underlying said message;

wherein said change occurs at only in partial area of the screen in proximity to the message not affecting the full screen display, wherein the change is not initialized by scrolling operations or uploading operations;

removing the message from the area;

identifying a new area in the display that allows placing another message of low interference with the workflow; and placing the other message in the another identified area of interference, upon identification the change, wherein said method enables said identification of areas and said placing and removing of messages in and from the at least one area for areas of different types applications, including web and non-web applications, used by the user.

\* \* \* \* \*